OSCILLOSCOPE DISPLAY OBTAINED FOR TYPICAL CAVITY RESONATOR

INVENTOR
R.C. FLETCHER
BY
*H. O. Wright*
ATTORNEY

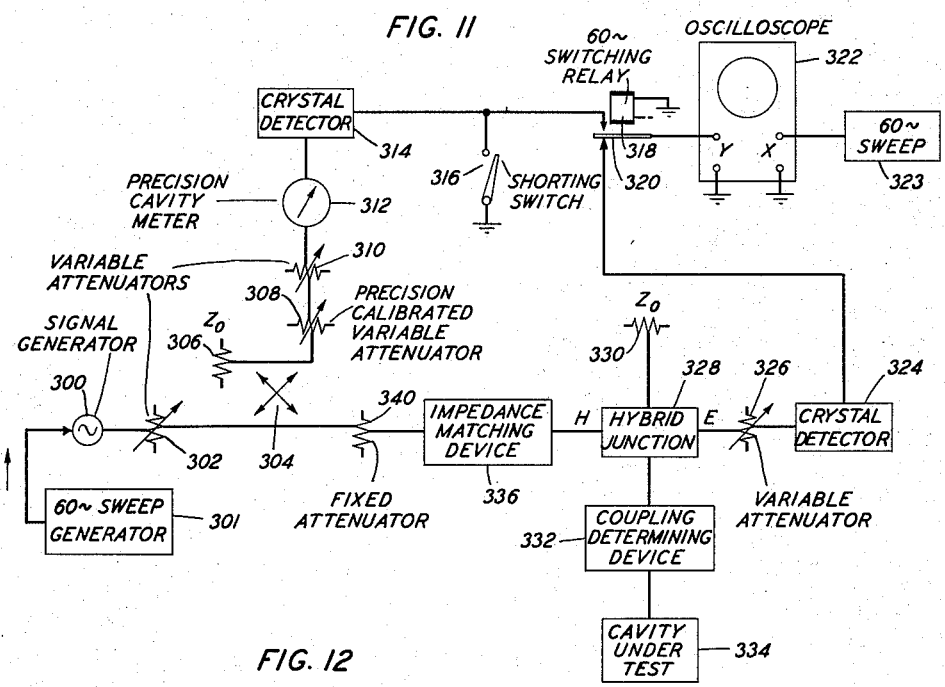
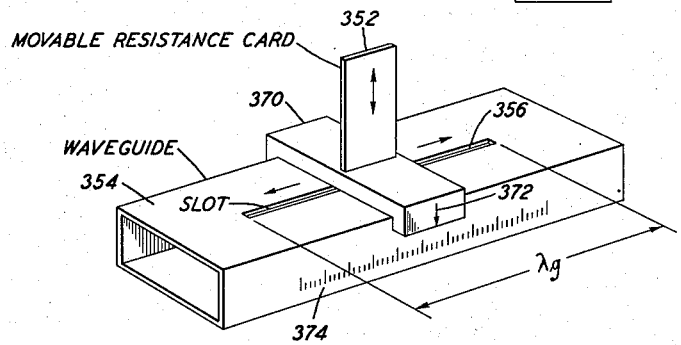
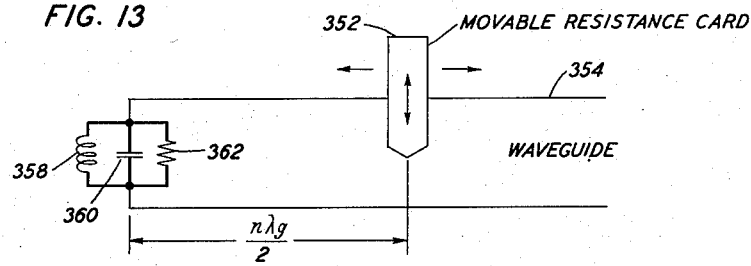
INVENTOR
R.C. FLETCHER
BY
H. O. Wright
ATTORNEY

United States Patent Office 2,760,156
Patented Aug. 21, 1956

2,760,156

METHOD AND APPARATUS FOR DETERMINING PHASE ANGLE AND/OR COUPLING SIGN IN MEASURING MICROWAVE IMPEDANCES

Robert C. Fletcher, Chatham, N. J., assignor to Bell Telephone Laboratories, Incorporated, New York, N. Y., a corporation of New York Application June 26, 1952, Serial No. 295,781

4 Claims. (Cl. 324—58)

This invention relates to systems and methods for effecting the rapid and precise determination of the phase and/or the sign of the reflection coefficient of a microwave impedance. More particularly, it relates to methods and circuits for determining the phase and/or sign of the coupling coefficient in microwave circuits involving the determination of the power reflection characteristics of a microwave impedance being tested at a particular microwave frequency or over a band of microwave frequencies with which the impedance is to be used.

A principal object of the invention is to provide improved circuits for measuring particular characteristics of impedances at microwave frequencies.

Another object is to provide novel means for determining the phase of the reflection coefficient of an impedance at microwave frequencies.

A further object is to provide novel means for determining the sign of the reflection coefficient of an impedance at very high or microwave frequencies.

Other and further objects will become apparent during the course of the following detailed description of illustrative embodiments involving the principles and illustrating ways of practicing the invention, as well as from the appended claims.

Likewise, the principles of and ways of practicing the invention will become apparent during the course of the following detailed description of illustrative embodiments taken in conjunction with the accompanying drawings, in which:

Fig. 11 shows, in block schematic diagram form, a more complex circuit incorporating in a second form certain of the principles of the invention;

Fig. 12 shows an arrangement employed in determining the phase of the coupling coefficient, or whether the impedance under test is "overcoupled" or "undercoupled"; and Fig. 13 is a schematic diagram employed in explaining the use of the arrangement of Fig. 12.

Figure 1:
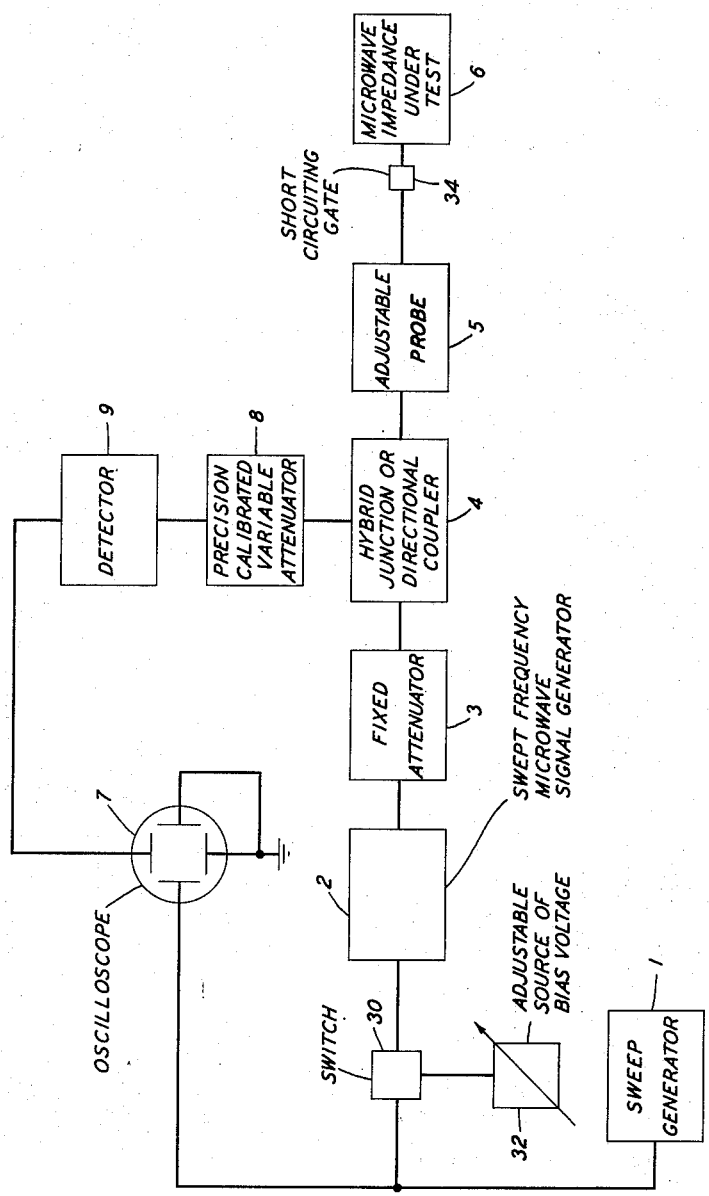
Fig. 1 is a block schematic diagram of a simple circuit in connection with which one way of practicing certain principles of the invention will be explained.

In more detail, in Fig. 1 a block schematic diagram of a circuit useful in the microwave frequency range (300 megacycles and above) to investigate certain properties of microwave impedances, is shown. In Fig. 1, a microwave signal generator 2, which can provide either a single frequency, the value of which can be adjusted over a wide range of frequencies, or a signal the frequency of which can be recurrently swept through a range of microwave frequencies corresponding to the frequency range over which the particular impedance 6 under test is to be operated. The frequency sweeping action, when employed, is preferably controlled by a voltage wave generated by sweep generator 1. Normally, the characteristics of the device under test throughout a predetermined frequency range will be of primary interest so that the frequency sweep of generator 2, when employed, will usually be adjusted to correspond substantially with said range.

Generator 2 can be, by way of a specific example, a reflex klystron oscillator having a normal operating range in the vicinity of 4000 megacycles, the frequency of which can be readily varied over a frequency range in the order of 20 or more megacycles by varying the voltage applied to its repeller anode. This type of tube also, as is well known to those skilled in the art, normally includes mechanical or thermal means for tuning the resonant cavity of the tube which determines the median frequency about which the frequency variation obtainable by varying the repeller anode voltage takes place. (See vol. 7, Radiation Laboratories Series, published by McGraw-Hill Co., New York 1948.) Sweep generator 1 generates a control voltage wave of appropriate shape and amplitude to effect the desired frequency sweep of signal generator 2 and to simultaneously cause the electron beam of cathode ray oscilloscope 7 to be swept horizontally across the screen of the oscilloscope in synchronism with the frequency sweep of generator 2. Both the frequency sweep of generator 2 and the horizontal sweep of the oscilloscope 7 are preferably linear with time and recur at some regular convenient rate such, for example, as 60 cycles per second, in which instance generator 1 preferably provides a sawtooth wave recurring at the rate of 60 cycles per second.

For testing an impedance at a fixed frequency a switch 30 is provided to connect the repeller anode to an appropriate source of bias voltage 32 instead of to generator 1, in which case the sole function of generator 1 is to provide a horizontal sweep voltage for oscilloscope 7. Source 32 is preferably manually adjustable so that the single testing frequency can be adjusted as desired over an appropriate range of frequencies.

Attenuator 3 can be a fixed attenuator (or pad) which introduces a transmission loss in the order of 10 decibels. This attenuator 3 serves to reduce the coupling between the signal generator 2 and the circuit to the right of the attenuator and thus to "mask out" any impedance irregularities of and energy reflected from the last-mentioned circuit, which may arise during adjustments of the apparatus units in the circuit.

Unit 4 can be either a hybrid junction or a directional coupler and its function is to pass power from generator 2 on to units 5 and 6 but to divert substantially all power reflected from these units, by way of the circuit including units 8 and 9 to the vertical deflecting plates of oscilloscope 7. Unit 8 is, as indicated on the drawing, a precision calibrated variable attenuator, the purpose of which will be discussed hereinunder and unit 9 is a detector (which can, of course, include an amplifying section where small amounts of reflected power are to be measured). Detector 9 converts the microwave energy into low frequency energy. Suitable types of hybrid junction circuits and directional couplers for use as unit 4 of Fig. 1 will be discussed in detail below in connection with the more complex circuit illustrated by the diagram of Fig. 11. It should be noted that, in the case of unit 4, the device employed should divert substantially all reflected power via units 8 and 9 to the vertical deflecting plates of oscilloscope 7, whereas in Fig. 11 the directional coupler 304 diverts only a portion of the power applied to its input to the side circuit and passes the remainder along its primary transmission line.

Adjustable impedance device 5 can be of the type illustrated in Figs. 12 and 13 and described in detail below in connection with the circuit arrangements of Figs. 11, 12 and 13, wherein a resistive vane is arranged so that it can be inserted into a longitudinal slit in a section of wave guide and moved longitudinally along said wave guide. Alternatively, a metallic probe can be substituted for the resistive vane. The characteristics of a typical microwave impedance under test and the effects thereon of the two alternative forms which the adjustable device 5 can take, are illustrated in the admittance diagrams of Figs. 2 and 3, respectively, which will be discussed in detail presently.

Device 6 is a microwave impedance, particular electrical properties of which can be explored by the circuit of Fig. 1. For example, with the vane (or probe) of device 5 entirely withdrawn from the transmission line, and the frequency sweep of generator 2 substantially centered with respect to the operating frequency range of device 6, a trace on the oscilloscope 7 of reflected power versus frequency for device 6 will be obtained, which represents the power reflected by device 6 at each frequency within the swept range. In general, this trace will be an undulating or "wavy" line, the amplitudes of the departures therein from a straight horizontal line being dependent, obviously, upon the degree and variations of impedance mismatch between device 6 and the testing circuit as the frequency is swept through the frequency range.

*Measurement of reflection coefficient and phase angle*

A short-circuiting gate 34 is provided substantially at the point of coupling of the device 6 to the testing circuit. In the usual case for microwave frequency measurements the microwave units of a circuit such as Fig. 1 will be interconnected by sections of wave-guide transmission line, in which case gate 34 can be a shutter or flat plate of highly conductive material such as copper or brass adapted to be inserted transversely through a suitable slot into the wave guide to completely close it at substantially the point of coupling of device 6 to the testing circuit. When gate 34 is "open" the shutter member is completely withdrawn from the wave guide. With gate 34 closed, normally the reflected energy reaching oscilloscope 7 will be substantially increased and a sufficient known loss can be inserted in the input circuit to oscilloscope 7 by adjustment of calibrated attenuator 8 to decrease the amplitude of the vertical deflection of the ray of oscilloscope 7 to substantially that obtained with gate 34 open (i. e., that resulting from reflection from device 6). This type of measurement is preferably made with generator 2 set at a particular single frequency of interest and the difference in the loss in decibels which must be inserted in attenuator 8 with gate 34 closed to that required with gate 34 open for the same vertical deflection on oscilloscope 7 is obviously a measure of the reflection coefficient of the device 6. Successive measurements at other single frequencies over the operating frequency range will obviously provide data showing the variation of the reflection coefficient through the operating frequency range. For all measurements of the reflection coefficient as described above, the vane (or probe) of device 5 should, of course, be completely withdrawn from the transmission line.

An indication of the phase of the reflected power can be obtained by inserting the resistive vane of device 5 into the transmission line and moving it longitudinally (while maintaining its protrusion into the line constant) to discover the positions at which maximum and minimum reflected power, respectively, can be observed. (Normally wave-guide transmission line will be employed at microwave frequencies though occasionally sections of coaxial line may be employed. The methods described, as is obvious to those skilled in the art, are applicable to either type of line.)

Figure 2:
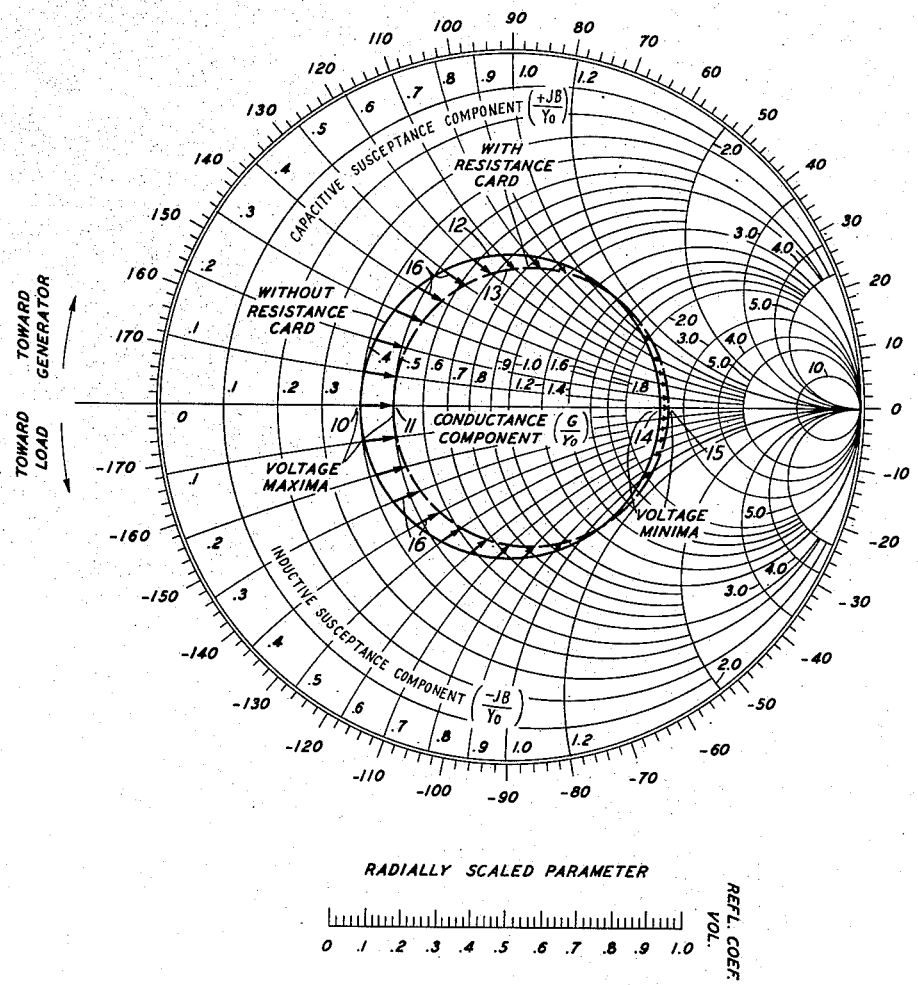
Figs. 2 and 3 are admittance diagrams showing the effects of inserting resistive or capacitative impedance members respectively, and moving them along the transmission line to which an unknown admittance (or impedance) is connected.
Figure 3:
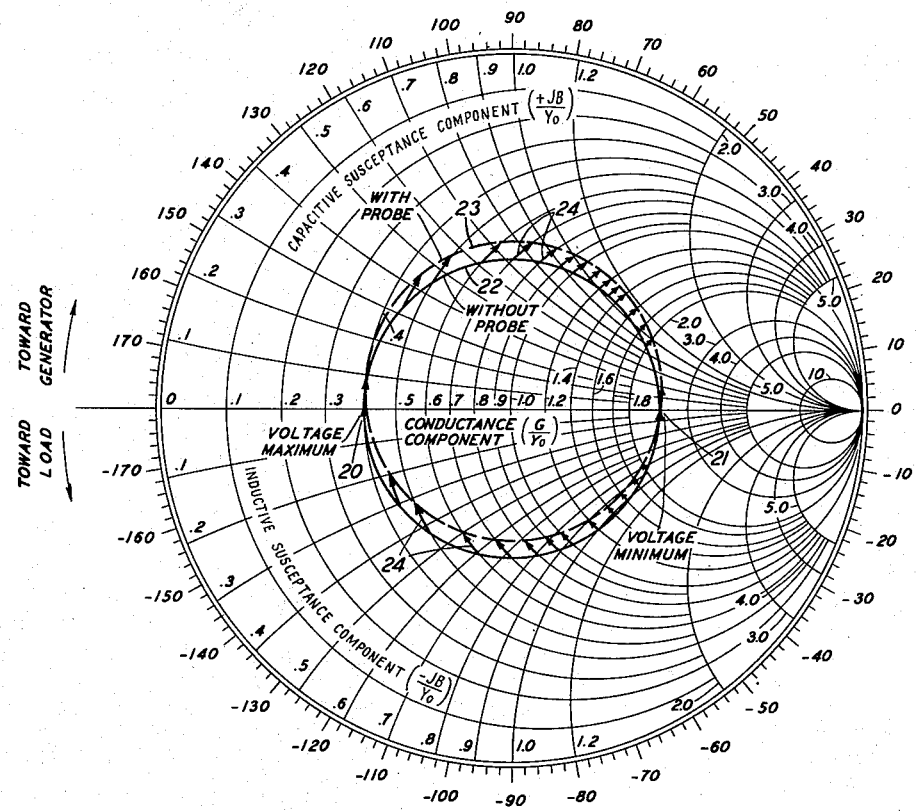
Figure 5:
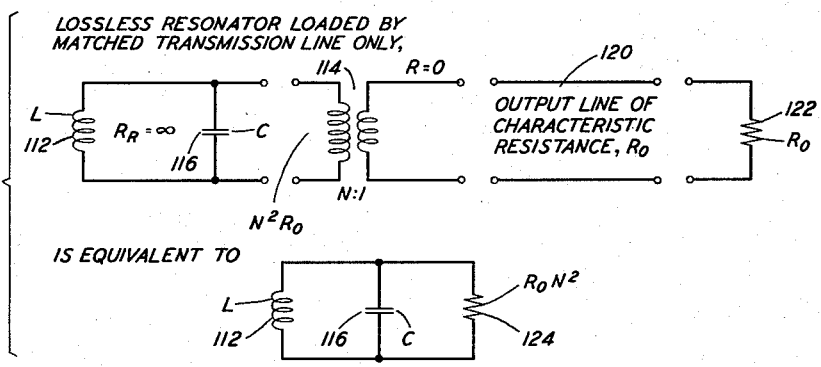

The resistive vane is, electrically, a resistance in parallel with the unknown impedance of the resonant cavity under test and its effective value (in view of the impedance transforming effect of the line) depends upon not only the extent to which it protrudes into the line but also its position along the transmission line to which the impedance under test is connected. The point at which the vane causes the minimum reflected power indicates a voltage maximum and the point at which it causes maximum reflected power is a voltage minimum. The distance in wavelengths from the impedance under test to either of the above-mentioned minimum or maximum positions provides an indication of the phase of the reflection coefficient. By way of specific example, with the resistive vane of the device of Fig. 5 adjusted to the position of minimum reflection, the phase of the reflection coefficient $\theta$ is $$\frac{4\pi L}{\lambda_g}+\pi$$

where $L$ is the distance of the vane from device 6 when adjusted to the position of minimum reflection and $\lambda_g$ is the wavelength in the wave guide of the particular frequency at which the test is being made. An appropriate scale calibrated in degrees for each specific frequency at which tests are to be made can obviously be provided adjacent the longitudinal slot in which the resistive vane is inserted. Where only a few specific frequencies are to be used the several scales can all be provided, or where many widely differing testing frequencies are to be used a scale for each frequency can be provided on a detachable strip adapted to be affixed adjacent to the slot. Preferably, the device 5 is situated closely adjacent to device 6 so that the distance $L$, mentioned above, will always be less than $\lambda_g$. The characteristics of the impedance under test and vane combination will be more readily apparent from the "Smith admittance diagram" of Fig. 2. (For explanations of "Smith impedance and admittance diagrams," see the text entitled "Radio Engineering" by Professor F. E. Terman, published by McGraw-Hill Co., New York 1947, starting at page 95, or the text entitled "Principles and Applications of Waveguide Transmission" by Dr. George C. Southworth, published by D. Van Nostrand Co., New York 1950, starting at page 62.) In Fig. 2, the full line circle 12 is the apparent admittance caused by a particular load admittance when viewed from various positions in the connecting wave guide, with the resistive vane of device 5 completely withdrawn from its associated transmission line. It causes a voltage maximum 10 and a voltage minimum 14. In this diagram, the radius is proportional to the magnitude of the reflection coefficient and the polar angle is the phase angle of the reflection coefficient.

The introduction of the resistive vane of the device 5 is equivalent to moving along a constant susceptance line towards increasing conductance (to the right) and results in the dash line circle 13 as the admittance circle of the combination. It is apparent, considering all possible phases of the initial reflection coefficient, that a given increase in conductance causes the largest decrease in reflection coefficient at the extreme left (corresponding to the maximum in the voltage standing wave) and the largest increase in reflection coefficient at the extreme right (corresponding to the minimum of the voltage standing wave). The arrows 16, connecting the two circles 12 and 13, illustrate the change caused by the addition in parallel of a constant conductance equal to $\frac{1}{10} Y_0$.

An alternative to the use of a resistive vane in the device 5 of Fig. 1 is the use of a metallic or highly conductive probe. This introduces a capacitative reactance in parallel with the load when inserted through a slot in the broader side of the usual rectangular wave guide having unequal cross-sectional dimensions (or an inductive reactance if inserted through a slot in the narrower side of said wave guide). The effects of inserting such a highly conductive probe to introduce a capacitative reactance are illustrated in the admittance diagrams of Fig. 3, in which the solid line circle 22 corresponds to the impedance under test without the probe in the connecting line and the dash line circle 23 corresponds to the combination of the impedance under test and the probe, arrows 24 indicating the change from one to the other, the general effect being to move the impedance circle upwardly as shown, without changing the voltage maximum and minimum points 20 and 21. Thus, a null method of determining the voltage maxima and minima is provided which may have the advantage of greater sensitivity. This advantage is off-set to some extent in that to determine whether an observed null point is a maximum or a minimum, it is necessary to further adjust the longitudinal position of the probe by moving it toward the impedance under test and observing whether the reflected power increases or decreases. In the first case, the null is at a voltage minimum and in the second it is at a voltage maximum. A further difficulty is that the susceptance of the inserted probe must be small compared to the characteristic admittance of the transmission line, for otherwise the maximum null position will be moved toward the impedance under test and the minimum null position will be moved in the opposite direction.

In addition to its use, as above described in connection with the circuit of Fig. 1, the device 5 of Fig. 1, as shown in more detail in Figs. 12 and 13 and described hereinafter, provides the basis for a method by which the sign of the coupling (i. e., whether overcoupled or undercoupled, as will be explained in detail below) of the impedance under test to a testing circuit for measuring the "Q" of the particular type of impedance known in the art as a resonant cavity, can be determined. As is well known to those skilled in the art "Q" is defined as the ratio of energy stored to energy lost per cycle of the particular device or combination of devices being investigated. The "Q" measuring circuit, shown in Fig. 11, with the exception of the device 332 (illustrated in detail in Figs. 12 and 13), was devised by E. D. Reed, a member of the Technical Staff, of the Bell Telephone Laboratories, Incorporated (applicant's assignee) and is described in an article by him published in the Proceedings of the National Electronics Conference for 1951, vol. 7, starting at page 162. The operation of the over-all circuit of Fig. 11 is based upon the following theory.

*Theory of Q-measurement by reflected power*

It is well known in the art that there exists a definite relationship between the internal and external Q of a resonant cavity on the one hand and the shape of its resonance curve in terms of input standing wave ratio on the other hand. A Q-measurement based on this relationship, however, involves a point-by-point determination of the standing wave ratio which is a tedious time-consuming process. If, however, a relation can be established between cavity Q and the shape of the resonance curve in terms of reflected power, then the measurement can be greatly simplified since by means of a hybrid junction or directional coupler used in conjunction with a swept signal source a continuous plot of reflected power as a function of frequency can be displaced on an oscilloscope screen. The rest of this section will show that such a relation can be derived and will provide the theoretical background for this method of measurement.

Figure 4:
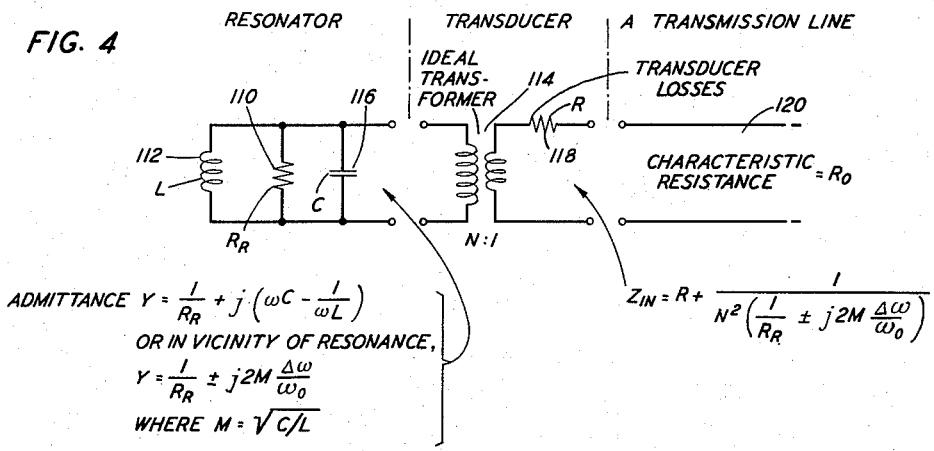
Figs. 4 and 5 are equivalent schematic circuits employed in explaining certain principles of the invention.

An equivalent electrical schematic circuit for a resonator (i. e., a resonant cavity) plus its output coupling, the cavity having only one resonance near the frequency of operation, is shown in Fig. 4. The resonant shunt impedance is represented by resistance 110, designated $R_R$. The coupling circuit is represented by an ideal transformer 114 and the circuit loss associated with the coupling circuit by the series resistance 118 designated $R$. The turns ratio, $N$, of ideal transformer 114 will later be shown to be proportional to the "looseness" of coupling, with a high value of $N$ meaning very light or "loose" coupling and vice versa. At a point A in the output line sufficiently close to the actual coupling loop or iris, so that line effects may be neglected, the impedance looking into the cavity is given by, $$Z_{in} = R + \frac{1}{N^2\left(\frac{1}{R_R} \pm j2m\frac{\Delta\omega}{\omega_0}\right)} \quad (1)$$

where $$M + \sqrt{\frac{C}{L}}$$

equals the characteristic resonator admittance. The capacity $C$ of the resonant cavity is represented in Fig. 4 by a condenser 116 and the inductance $L$ by a coil 112. $\omega_0 = 2\pi f_0$ where $f_0$ is the frequency at which the cavity is resonant. $\Delta\omega$ represents the deviation from resonance of a particular frequency at which a measurement is being made. Normalizing the above expression with respect to the characteristic guide resistance, $R_0$, of the wave guide 120 to which the resonant cavity is to be connected for operation, $$\frac{Z_{in}}{R_0} = \frac{R}{R_0} + \frac{1}{\frac{R_0 N^2}{R_R} \pm jMR_0 N^2 \frac{2\Delta\omega}{\omega_0}} \quad (2)$$

At frequencies far from resonance $\Delta\omega$ becomes very large and Equation 2 may be written, $$\frac{Z_{in}}{R_0} = \frac{R}{R_0} (\text{off resonance}) \quad (3)$$

while at resonance where $\Delta\omega = 0$, $$\frac{Z_{in}}{R_0} = \frac{R}{R_0} + \frac{R_R}{R_0 N^2} (\text{at resonance}) \quad (4)$$

For a lossless output circuit $R = 0$ and consequently the input impedance off resonance will also equal zero. In practice some losses may be present, but for a well designed output circuit $R/R_0 \ll 1$. This shows that the input impedance off resonance is close to zero and depends on the circuit loss only, while at resonance it is a function primarily of the resonant shunt impedance and the degree of coupling.

By definition, the reflection coefficient, $r$, is given by, $$r = \frac{\frac{Z_{in}}{R_0} - 1}{\frac{Z_{in}}{R_0} + 1} \quad (5)$$

Calling the reflection coefficient off resonance $r_1$, then by substitution of Equation 3 into Equation 5 its value becomes, $$r_1 = \frac{\frac{R}{R_0} - 1}{\frac{R}{R_0} + 1} (\text{reflection coefficient off resonance}) \quad (6)$$

It should be borne in mind here that since $$\frac{R}{R_0} \ll 1$$

the value of $r_1$ will in most cases be close to $-1$. Solving Equation 6 for $R/R_0$, $$\frac{R}{R_0} = \frac{1+r_1}{1-r_1} \qquad (7)$$

Similarly, by substitution of Equation 4 into Equation 5, the reflection coefficient at resonance, $r_0$, is obtained as, $$r_0 = \frac{\left(\frac{R}{R_0} + \frac{R_R}{R_0 N^2}\right) - 1}{\left(\frac{R}{R_0} + \frac{R_R}{R_0 R^2}\right) + 1} \qquad (8)$$

or $$\left(\frac{R}{R_0} + \frac{R_R}{R_0 N^2}\right) = \frac{1+r_0}{1-r_0} \qquad (9)$$

Another useful relation may be derived by putting Equation 7 into Equation 9, namely, $$\frac{R_R}{R_0 N^2} = \frac{1+r_0}{1-r_0} - \frac{1+r_1}{1-r_1} = \frac{2(r_0-r_1)}{(1-r_0)(1-r_1)} \qquad (10)$$

Equation 2 may now be rewritten in terms of the reflection coefficient, $r_0$ and $r_1$ as, $$\frac{Z_{in}}{R_0} = \frac{1+r_1}{1-r_1} + \frac{1}{\frac{(1-r_0)(1-r_1)}{2(r_0-r_1)} \pm j M R_0 N^2 \frac{2\Delta\omega}{\omega_0}} \qquad (11)$$

Before the final expression on which this method of measurement is based can be derived, the Q's of the resonator will have to be defined and introduced into the above equations.

The Q of the cavity when loaded by its own losses only, is defined as the internal Q and designated as $Q_0$. It equals the characteristic admittance of the resonator times the shunt resistance representing resonator losses, i. e., $$Q_0 = M R_R \qquad (12)$$

Similarly, the external resonator Q, designated $Q_E$, is defined by considering the cavity to be lossless and loaded by a matched transmission line only, and again it equals the characteristic resonator admittance times the equivalent shunt resistance resulting from the transformed value of the matched output line. Inspection of Fig. 5, which is substantially identical to Fig. 4 except that resistance 110 has been omitted (since for a lossless resonator $R_R = \infty$) and line 120 terminated in its characteristic resistance 122, of the value $R_0$, has been connected to the ideal transformer 114 output, will make it clear that the value of this equivalent shunt resistance equals $R_0 N^2$. Hence, $$Q_E = M R_0 N^2 \qquad (13)$$

This expression for $Q_E$ also shows that N is proportional to the looseness of coupling as was stated before, since the external Q must increase as the load is progressively decoupled, by reducing the loop or iris size or by other means.

Equations 12 and 13 may also be used in defining three possible degrees of coupling. A cavity is said to be critically coupled if its internal and external Q are equal, i. e., if $R_R = R_0 N^2$. Putting this value of $R_R$ into Equation 8 and remembering that $R/R_0 \ll 1$, it is seen that the reflection coefficient at resonance, $r_0$, for this case is practically equal to zero. In the undercoupled case $Q_E > Q_0$ or from Equations 12 and 13 $R_R/R_0 N^2 < 1$. Substituting this inequality into Equation 8 shows that the reflection coefficient at resonance for an undercoupled cavity must always be negative.

From a similar argument applied to the overcoupled case in which $Q_E < Q_0$ it follows that $r_0$ is positive. These relations are summarized in the table below:

| Degree of Coupling | Relation Between Q's | Value of Reflection Coefficient at Resonance |
|---|---|---|
| Undercoupled | $Q_E > Q_0$ | $(-1) < r_0 < 0$ |
| Critically coupled | $Q_E = Q_0$ | $r_0 = 0$ |
| Overcoupled | $Q_E < Q_0$ | $0 < r_0 < (+1)$ |

A relationship between the internal and external Q in terms of the reflection coefficients $r_0$ and $r_1$ is obtained by substituting Equations 12 and 13 into Equation 10, namely, $$\frac{Q_0}{Q_E} = \frac{2(r_0-r_1)}{(1-r_0)(1-r_1)} \qquad (14)$$

For an output circuit with very small or no loss $r_1 = -1$ and Equation 14 simplifies to $$\frac{Q_0}{Q_E} = \frac{1+r_0}{1-r_0} \text{ (for zero circuit loss, or } r_1 = -1) \qquad (15)$$

The normalized input impedance of the cavity as a function of frequency may now be rewritten substituting $Q_E$ for $M R_0 N^2$ in Equation 11. Thus, $$\frac{Z_{in}}{R_0} = \frac{1+r_1}{1-r_1} + \frac{1}{\frac{(1-r_0)(1-r_1)}{2(r_0-r_1)} \pm j Q_E \frac{2\Delta\omega}{\omega_0}} \qquad (16)$$

or, using the abbreviation, $$\delta = Q_E \frac{2\Delta\omega}{\omega_0} = Q_E \frac{2\Delta f}{f_0} \qquad (17)$$

$$\frac{Z_{in}}{R_0} = \frac{1+r_1}{1-r_1} + \frac{2(r_0-r_1)}{(1-r_0)(1-r_1) \pm j \delta 2(r_0-r_1)} \qquad (18)$$

This expression relates the normalized input impedance to the reflection coefficients, $r_0$ and $r_1$ and a term, $\delta$, containing both $Q_E$ and frequency. In order to obtain an expression for the reflection coefficient as a function of frequency, Equation 18 will have to be substituted into the general expression for the reflection coefficient as given by Equation 5. This yields $$r = \frac{\left[\frac{1+r_1}{1-r_1} + \frac{2(r_0-r_1)}{(1-r_0)(1-r_1) \pm j\delta 2(r_0-r_1)}\right] - 1}{\left[\frac{1+r_1}{1-r_1} + \frac{2(r_0-r_1)}{(1-r_0)(1-r_1) \pm j\delta 2(r_0-r_1)}\right] + 1} \qquad (19)$$

The quantity of interest here, however, is not $r$ but $|r|^2$ which equals the ratio of reflected power to incident power and may be obtained from the above by further manipulation as, $$\frac{\text{Reflected Power}}{\text{Incident Power}} = |r|^2 = \frac{4 r_1^2 (r_0-r_1)^2 \delta^2 + r_0^2 (1-r_1)^4}{4 (r_0-r_1)^2 \delta^2 + (1-r_1)^4} \qquad (20)$$

Figure 6:
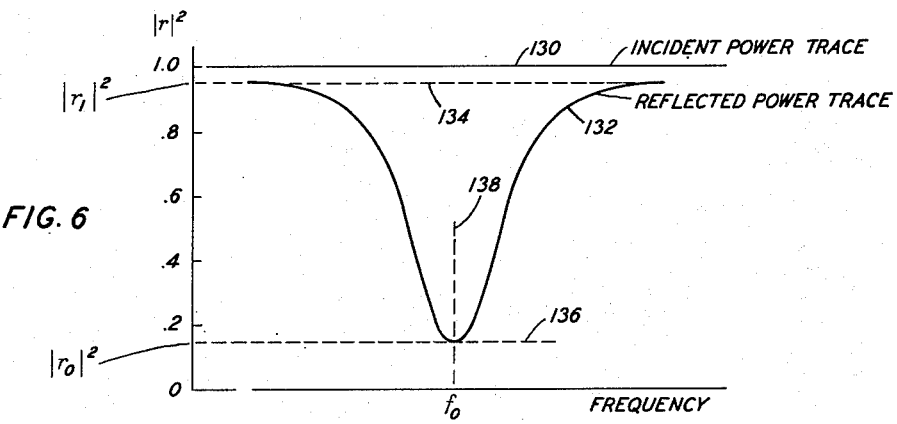
Fig. 6 is a typical curve of the ratio of reflected power to incident power $|r^2|$ employed in explaining particular features of the invention.

Here, then, is the expression which forms the basis of the determination of Q by reflected power. One method of using Equation 20 for this purpose is the following: Suppose a display of reflected power as a function of frequency has been obtained. A typical display, as obtained, for example, by a system of the type to be described below in connection with Fig. 11, is shown in Fig. 6 wherein trace 130 represents incident power and trace 132 represents reflected power over the range of frequencies of interest. The ordinates of Fig. 6, 1.0, .8, et cetera, represent $|r|^2$. The level of curve 132 sufficiently far from the resonant frequency $f_0$ to be substantially parallel with trace 30, represented by dash-line 134, represents $|r_1|^2$ and the lowest point on trace 132 occurring at the resonant frequency (dash line 138) the level of which is indicated by dash line 136 represents $|r_0|^2$. From traces, as illustrated in Fig. 6, therefore, the values of $|r_0|^2$, $|r_1|^2$, and $\omega_0$ may be read off directly. By another and independent test, which will be described in a later section hereinunder, it can be determined whether the cavity is undercoupled or overcoupled. This will decide the correct sign of $r_0$, while $r_1$ is known to be negative. For an overcoupled cavity the positive square root of $|r_0|^2$ must be used while for an undercoupled cavity the negative square root of $|r_0|^2$ gives the correct value of $r_0$. The actual conversion from $|r_0|^2$ (usually obtained in decibels) to $r_0$ expressed as a fraction, is facilitated by the graph 140 of Fig. 7. With the values of $r_0$ and $r_1$ thus determined, Equation 20 may be plotted in the form of a family of curves with $Q_E$ as a parameter, i. e., with each curve corresponding to a different assumed value of $Q_E$. The desired value of $Q_E$, then, is the one corresponding to that curve which coincides with the experimental plot of $|r|^2$ versus frequency.

This procedure, though accurate, is obviously impractical. It has been included only to illustrate the relation between Equation 20 and a plot of reflected power as a function of frequency.

Figure 8:
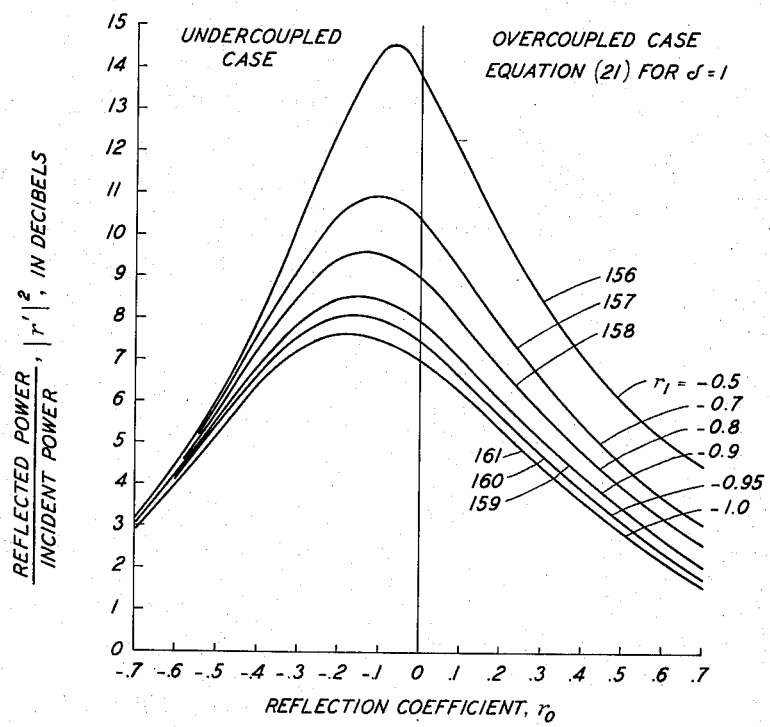
Figs. 8 and 9 are graphical representations of the ratio $|r'|^2$, as given by Equation 21 hereinbelow, for various values of the parameters $r_0$ and $r_1$ when values of the parameter $\delta$ of 1 and 2, are assumed, respectively.

A better way of using Equation 20 for the evaluation of $Q_E$ is this: Suppose $\delta$ is assigned an arbitrary value of 1 and the corresponding value of $|r|^2$ is called $|r'|^2$. Equation 20 then becomes $$|r'|^2 = \frac{4r_1^2(r_0-r_1)^2 + r_0^2(1-r_1)^4}{4(r_0-r_1)^2 + (1-r_1)^4} \quad (21)$$

for $$\delta = Q_E \frac{2\Delta f}{f_0} = 1 \quad (22)$$

and may be plotted in the form of a family of curves with $|r'|^2$ as the ordinate, $r_0$ as the abscissa and $r_1$ as parameter, as shown by curves 156 through 161, inclusive, for the values of $r_1 = -0.5, -0.7, -0.8, -0.9, -0.95$ and $-1.0$, respectively, on Fig. 8. Having determined particular values of $r_0$ and $r_1$ from a plot of reflected power the corresponding value of $|r'|^2$ may be read off this family of curves directly. It gives the level at which $$\delta = Q_E \frac{2\Delta f}{f_0} = 1$$

Hence, by measuring the band width, $(2\Delta f)$, at this level $Q_E$ may be obtained from Equation 22 as $$Q_E = \frac{f_0}{(2\Delta f)} \text{ (using Fig. 8)} \quad (23)$$

The internal Q, $Q_0$, then follows from either Equation 14 or Equation 15 depending on whether $r_1$ is greater than or equal to $(-1)$. If desired, the loaded Q, designated $Q_L$, may be computed from the well known relation.

$$\frac{1}{Q_L} = \frac{1}{Q_E} + \frac{1}{Q_0} \quad (24)$$

Figure 7:
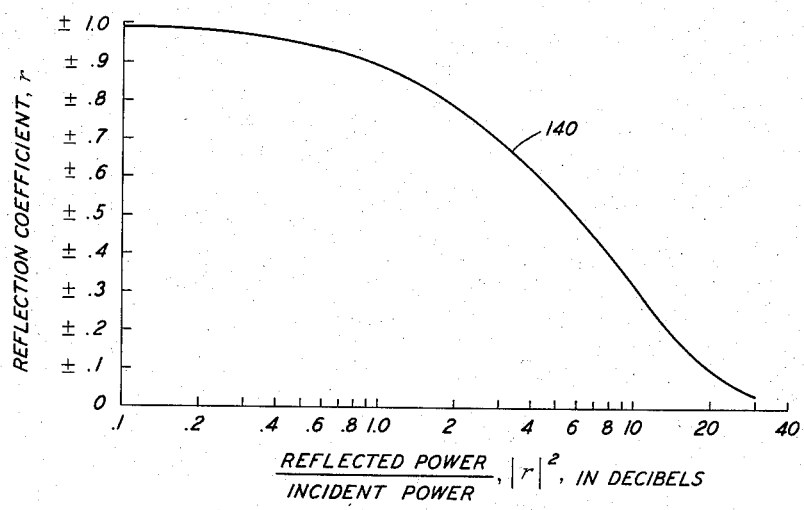
Fig. 7 is a graph showing the relation between the reflection coefficient $r$ and the ratio $|r^2|$ of Fig. 6.

In the case of a greatly undercoupled or overcoupled cavity the value of $|r'|^2$ as obtained from Fig. 7 would entail measuring the width of the resonance curve so close to the minimum that the accuracy might be poor. To obtain a band width determination further up on the resonance curve a plot similar to the one of Fig. 8, but using a value of $\delta = 2$, was prepared. This is given in curves 150 through 155, inclusive, of Fig. 9. In applying these curves it should be remembered that $$Q_E = \frac{2f_0}{(2\Delta f)} \text{ (using Fig. 9)} \quad (25)$$

Plots using a value of $\delta$ greater than 2 could, obviously, also be prepared for use in instances in which the band width of the resonance curve is extremely narrow.

*Measurement procedure*

The steps in determining the internal and external Q of a resonant cavity may now be summarized as follows:
1. Determine whether the cavity is undercoupled or overcoupled (see later section "Determination of coupling sign") and obtain plot of $|r|^2$, i. e.

$$\frac{\text{reflected power}}{\text{incident power}}$$

on an oscilloscope screen by use, for example, of a system of the type which will be described in detail below in connection with Fig. 11.

2. Read off values of $|r_0|^2$ and $|r_1|^2$ in decibels and convert to $r_0$ and $r_1$ by means of graph 140 of Fig. 7.

3. Enter graph of Fig. 8 at value of $r_0$ and intersect with appropriate $r_1$-curve. Read off value of $|r'|^2$ in (decibels) corresponding to point of intersection. In the case of a greatly under or overcoupled cavity the value of $|r'|^2$ may be obtained more readily and accurately from Fig. 9.

Figure 9:
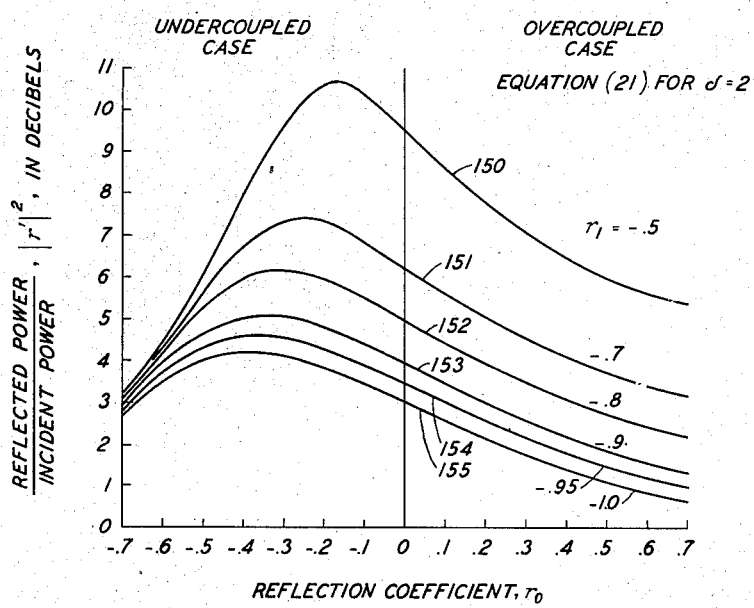

4. Determine width (in megacycles) of reflected-power-trace on oscilloscope screen at the level $|r'|^2$ decibels obtained in step 3. Calling this width $(2\Delta f')$, then the external Q is given by $$Q_E = \frac{f_0}{(2\Delta f')}, \text{ for Fig. 8}$$

or $$Q_E = \frac{2f_0}{(2\Delta f')}, \text{ for Fig. 9}$$

The internal Q follows from Equation 14 as $$Q_0 = Q_E \frac{2(r_0-r_1)}{(1-r_0)(1-r_1)}$$

or for the case of zero circuit loss from Equation 15 as $$Q_0 = Q_E \frac{1+r_0}{1-r_0}$$

and the loaded Q, $Q_L$, from the relation $$\frac{1}{Q_L} = \frac{1}{Q_0} + \frac{1}{Q_E}$$

*Description of an embodiment of a measuring circuit for use in practicing particular principles of the invention*

In Fig. 11, another embodiment of a measuring circuit for use in practicing the invention is illustrated.

It comprises a signal generator 300 which can be a reflex klystron oscillator of the type described above for use as generator 2 of Fig. 1. Generator 300 can, by way of example, have a normal operating frequency range in the vicinity of 4000 megacycles, the frequency of which can be readily varied over a frequency range in the order of 20 or more megacycles by varying the voltage applied to its repeller anode. Sweep generator 301 can, for example, be of the type described above for generator 1 of Fig. 1, i. e., it can generate a voltage wave of appropriate shape and amplitude to effect the prescribed sweeping of the frequency of signal generator 300, when applied to its repeller anode, linearly through an appropriate frequency range at a convenient audio frequency rate such as 60 cycles per second. By way of example, the generator 301 can provide a sawtooth-shaped 60 cycle voltage wave of suitable amplitude.

The over-all circuit of Fig. 11, if designed, as contemplated in the present instance, for use at frequencies in the neighborhood of 4000 megacycles, will, between the signal generator 300 and the crystal detectors 314 and 324 of the upper and lower paths, respectively, most conveniently employ sections of wave-guide transmission line to interconnect the various component apparatus units, which units in turn will, of course, be structures suitable for operation at such high frequencies. Those skilled in the art term such high frequencies "microwave frequencies" or simply "microwaves" and likewise designate the apparatus units as "microwave" units. Suitable forms of the various units, to be described severally hereinunder, are well known to those skilled in the "microwave"

art. In accordance with common engineering practice, the various sections of transmission line (wave guide) interconnecting successive units throughout the system will normally all be of identical material, cross-sectional shape and cross-sectional dimensions and will consequently all have a particular predetermined characteristic impedance commonly designated $Z_0$. Normally, the characteristic impedance $Z_0$ of the wave guide used will be substantially a pure resistance and is designated $R_0$. Similarly, all units will be designed, insofar as is practicable, to present at their respective terminals, an impedance substantially equal to the wave-guide characteristic impedance $Z_0$ (or $R_0$), so that the reflection of energy and the creation of standing waves will be minimized. The power output of crystal detectors 314 and 324 is of low frequency and can, therefore, be transmitted through switching relay 318, 320 to the vertical deflecting means of oscilloscope 322 by conventional two conductor circuits.

A variable attenuator 302 is interposed between the high frequency output of the signal generator 300 and the remainder of the circuit of Fig. 11 to afford convenient control of the total power impressed upon the remainder of the circuit, which, as will become apparent hereinunder, is necessary to permit comparison of the performance of the two crystal detectors employed in the circuit.

From the output or right side of attenuator 302 two "microwave" electrical circuits or paths (designated upper and lower paths for convenient reference) lead to the upper and lower terminals, respectively, of the two position switching relay 318, 320, which relay serves to alternately connect first one path and then the other to the vertical deflecting means of a cathode ray oscilloscope 322. The switching relay 318, 320 and the sweep circuit 323 connecting to the horizontal deflecting means of cathode ray oscilloscope 322, are synchronized with the frequency sweep generator 301, by any of the conventional synchronizing arrangements (not shown) well known to those skilled in the art, so that each horizontal trace of the oscilloscope starts at the same instant as a frequency sweep of the signal generator 300 and the switching relay 318, 320 connects the above-mentioned two paths to the vertical deflecting means of the oscilloscope for alternate horizontal traces on the oscilloscope screen. The horizontal sweep preferably varies linearly with time and is coextensive in time with the frequency sweep of the signal generator 300.

The directional coupler 304, is preferably of the broad band, wave-guide variety, numerous species of which, by way of example, are described in detail in the copending application of S. E. Miller Serial No. 216,132, filed March 17, 1951, now Patent No. 2,701,340, and assigned to applicant's assignee. A portion of the energy from signal generator 300 passes through attenuator 302 and directional coupler 304 to fixed attenuator 340, which attenuator should introduce a loss in the order of 10 decibels. Attenuator 340 serves to reduce the coupling between the signal generator 300 and the circuit to the right (impedance matching device 336, etc.) and thus to "pad" or "mask out" any impedance irregularities of, and energy reflected from, the last-mentioned circuit, which may arise during adjustments of the apparatus units in the circuit.

The output of attenuator 340 is introduced into impedance matching device 336 the function of which is to permit adjustment of the impedance presented to the input (H) terminal of the "magic-tee," or wave-guide hybrid junction, 328, to which it connects as shown in Fig. 11. Device 336 can be, for example, merely a section of wave guide having a longitudinal slot and provided with a conductive probe or rod adapted to be inserted an adjustable amount into the guide through the slot and to be moved longitudinally along the slotted section of guide.

Hybrid junction 328 is preferably of the wave-guide magic-tee type which includes impedance matching posts or plates near its throat or junction portion so that, as is well known to those skilled in the art, it will present a substantially uniform constant impedance of $Z_0$ at each of its four terminals or arms, over the frequency range to be used, when the other terminals or arms are terminated in the characteristic impedance $Z_0$ chosen for the remainder of the circuit components.

The hybrid junction 328 is preferably connected, as shown, with its H (parallel connecting) arm as its input terminal, its E (series connecting) arm as its output terminal and of its two collinear (vertical) arms, the upper is terminated by a microwave impedance 330 having a value of $Z_0$ and the lower is connected through a coupling determining device 332 to the resonant cavity 334 "under test" (i. e., the resonant cavity, the reflection characteristic and the Q of which is to be determined). The nature of device 332 and method of making use of it will be described in detail in connection with Figs. 12 and 13 below.

The output (E) terminal of hybrid junction 328 connects through a variable attenuator 326 to a crystal detector 324 the rectified output of which is connected to the lower terminal of the two position switch portion 320 of switching relay 318, 320 and as hereinabove described, is connected by the switching relay to the vertical deflecting means of oscilloscope 322 for alternate horizontal traces of the oscilloscope.

Directional coupler 304 also transmits a portion of the power from signal generator 300 through the upper path of Fig. 11, which path comprises a precisely calibrated variable attenuator 308 the purpose of which will be described hereinunder, a variable attenuator 310, a high Q wave meter 312, and a crystal detector 314, all the above-named units being connected in tandem between the upper output terminal of directional coupler 304 and the upper contact of switching relay 318, 320. The fourth terminal of directional coupler 304 at its upper left is terminated by impedance unit 306 having an impedance of $Z_0$. A shorting switch 316 is provided at the output of detector 314 to provide a condition of zero input power on the upper contact of switching relay 318, 320, for purposes of comparison, as will become apparent presently.

From inspection of Fig. 11, it is apparent that the output of detector 314, with switch 316 open, is a function of the incident power. It is applied to the oscilloscope through the top contact of the switching relay 318, 320. The uncalibrated variable attenuator 302 is common to both of the two electrical circuits or paths above-described, and its function, as mentioned above, is to permit convenient adjustment of the power input to the over-all circuit, whereby the relative responses of the two crystal detectors 314 and 324 can be checked at a number of power levels.

As is apparent from the foregoing description of the over-all circuit of Fig. 11, there will be two traces simultaneously appearing on the screen of the oscilloscope 322, one representing reflected power from cavity 334 and the other representing the incident power from signal generator 300, via the circuit including detector 314. The level corresponding to zero reflected power can be established by manually depressing the shorting switch 316 connected to the output of crystal detector 314.

The calibration procedure is as follows: Any residual unbalance of the hybrid junction is tuned out by adjustment of impedance matching device 336 (which, as above-mentioned, can comprise a simple probe the penetration of which into a longitudinal slot in the wave guide connecting to the input (H) arm of the wave-guide hybrid-tee 328 can be accurately controlled and the longitudinal position of which probe can likewise be accurately controlled), and the outputs of the two crystal detectors 314 and 324 are checked for identical response.

There are several ways in which the proper functioning of a hybrid junction or tee may be ensured. One method is to replace the cavity under test by a movable short circuit, for example, a section of wave guide having a movable short-circuiting plunger therein, and to adjust the impedance matching device 336, until the output of crystal detector 324 as observed on the oscilloscope 322 is independent of the position of the short-circuiting plunger. Having made sure by this (or other) means that the power reaching this detector is truly proportional to the power reflected from the unknown impedance, the equality of response of the two crystal detectors is then checked. For this latter purpose the oscilloscope traces representing the power incident upon and the power reflected from the short circuit are made to coincide by adjusting the uncalibrated variable attenuators 310 and 326. Attenuation affecting both traces is introduced by means of attenuator 302. If the traces remain coincident for all settings of attenuator 302, the crystal detector responses may be concluded to be identical. Should any variation be observed, however, then different crystals should be inserted until a pair having substantially identical responses over a large range of power levels is obtained.

Figure 10:
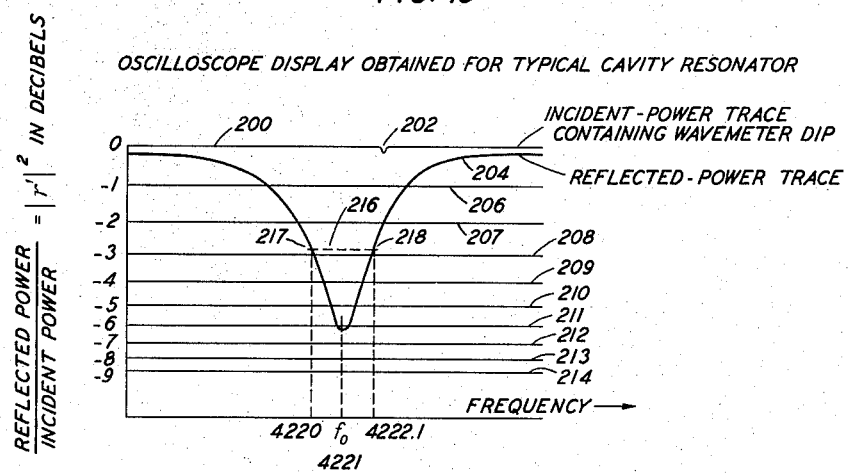
Fig. 10 shows a number of significant oscilloscope traces obtainable with a circuit of the type illustrated by Fig. 11 and is employed in the explanation of one method of utilizing certain principles of the invention.

With the cavity under test reinserted, the patterns appearing on the oscilloscope screen will be of the types illustrated by curves 200 and 204 of Fig. 10. Fig. 10, as shown, employs a different scale of ordinates from that used in Fig. 6 but is otherwise, obviously, very similar to Fig. 6. Trace 200 of Fig. 10 represents the incident power transmitted through the upper path of the circuit of Fig. 11 and includes a slight dip 202 which indicates the frequency to which the wave meter 312 is instantly adjusted. Trace 204 is the trace of reflected power from the cavity under test. The precision calibrated attenuator 308, which up to now has been set to zero, is next adjusted to provide a plurality of power traces 206 to 214, inclusive, representing the insertion of losses from 1 to 9 decibels, inclusive, respectively, as illustrated in Fig. 10. Traces 206 to 214, of course, appear one at a time as the precision attenuator 308 is adjusted to the loss corresponding to each particular trace. A trace at any intermediate power level between any two of the successive one decibel steps shown can, of course, be obtained by simply setting the precision attenuator 308 at the desired level in decibels.

To utilize the information available from traces such as those shown on Fig. 10, it is first determined, as will be explained in detail below, whether the resonant cavity under test is "undercoupled" or "overcoupled."

Assuming, for example, that the particular resonant cavity under test has been found to be "undercoupled" and noting from the trace 204 of reflected power that the point of resonance (or maximum loss) is $-6.0$ decibels and that at points "off-resonance," i. e., points where trace 204 is substantially horizontal, trace 204 is $-0.2$ decibel, we conclude that $|r_0|^2 = -6.0$ decibels and $|r_1|^2 = -0.2$ decibel. By use of conversion curve 140 of Fig. 7, we obtain $r_0 = +0.5$ and $r_1 = -0.98$. Then from Fig. 8 for the above values of $r_0$ and $r_1$ we obtain $|r'|^2 = -2.9$ decibels. Returning to Fig. 10, we note that the width of trace 204 for a value of $|r'|^2 = -2.9$ decibels, as represented by horizontal line 216 extending between points 217 and 218 on curve 204 is $2\Delta f = 2.1$ megacycles. The frequencies at points 217 and 218 are determined by the adjustments of wave meter 312 required to bring the dip 202 into alignment with these points, respectively, and are for Fig. 10, 4220 and 4222.1 megacycles, respectively. Assume further, that by adjustment of precision cavity wave meter 312 as described above, it has been determined that the resonant frequency $f_0$ is 4221 megacycles. Then from Equation 23, above, $$Q_E = \frac{f_0}{2\Delta f} = \frac{4221}{2.1} = 2000$$

And from Equation 14, above, $$Q_0 = 2000 \frac{2(0.5 + 0.98)}{(1 - 0.5)(1 + 0.98)} = 6000$$

Finally, from Equation 24, above, $$\frac{1}{Q_L} = \frac{1}{2000} + \frac{1}{6000} = \frac{2}{3000}$$

and $Q_L = 1500$ (loaded Q)

It should be pointed out that the incident power trace (200 of Fig. 10, for example) also represents the power-output versus repeller-voltage characteristic of the signal source 300. For the particular case shown in Fig. 10, the Q of the cavity was sufficiently high so that only a small fraction of the electronic tuning range of the reflex klystron had to be used. Hence, the incident power trace 200 appears as a sensibly straight horizontal line. It is perfectly permissible, however, to make use of the entire electronic tuning range of the signal generator in which case the incident power trace will assume the familiar shape of the mode pattern of the reflex klystron, which resembles, as is well known to those skilled in the art, a positive half cycle of a sine wave. The horizontal straight line traces such as 200, and 206 to 214, inclusive, would then appear as parallel positive approximate half sine waves, displaced vertically substantially as are traces 200 and 206 to 214 of Fig. 10. The reflected power trace 204 would be correspondingly distorted, but, in most instances, could still be effectively employed in determining the various Q's of the resonant cavity under test, precisely as described in detail above. If the cavity to be tested is of such low Q that an even wider frequency range is desired, the reflex klystron may be replaced by a mechanically swept microwave oscillator. The maximum allowable sweep is governed, of course, by the band width over which the hybrid junction 328 can be matched, with acceptable accuracy, for a single setting of the impedance matching device 336.

*Determination of coupling sign*

Since for a parallel resonant circuit at resonance (connected to a wave-guide transmission line having a particular characteristic admittance), the reflection from an admittance of the resonant circuit which is a certain ratio less than the characteristic admittance of the wave guide ("overcoupled") has the same amplitude as the reflection of an admittance of the resonant circuit which is the same ratio greater than the characteristic admittance of the wave guide ("undercoupled"), it is important to provide a quick, simple and convenient method of determining the "sign" of the reflection coefficient. If the resonant circuit is "overcoupled," as defined above, the sign of the coupling coefficient is said to be positive and conversely, if the circuit is "undercoupled," the sign of the coupling coefficient is said to be negative.

Every microwave resonant cavity when viewed from an appropriate position along its coupling wave guide exhibits the impedance characteristics of a parallel resonant circuit.

In accordance with the principles of the present invention, a resistive impedance is inserted at a point along the wave guide to which the resonant cavity is coupled, the point being selected so that the resistive impedance inserted is electrically effectively in parallel with the parallel resonant circuit comprising the resonant cavity under test. The admittance of the resistive element is, therefore, added to that of the resonant cavity.

As illustrated in the specific embodiment of Fig. 12, the resistive element 352 can be a resistive vane, for example a dielectric vane coated with carbon particles, which can be inserted through a longitudinal slot 356, the slot being substantially one median frequency wavelength long, in the associated wave guide 354, the extent of the vane's protrusion into the wave guide 354 and the longitudinal position of the vane along wave guide 354 being adjustable. To facilitate these adjustments the element 352 can, by way of example, be supported by a dielectric block 370 which is fitted over the top surface of guide 354, as shown, and can be moved longitudinally as required. Element 352 is fitted snugly in block 370 so that it can be adjusted vertically therein and will be maintained at its adjusted position. An indicating arrow 372 is provided on block 370 and a scale 374 is mounted on the lower portion of the side of wave guide 354 so that the longitudinal position of the vane 352 in the slot 356 can be readily determined. Scale 374 can, of course, be calibrated for particular frequency in any convenient units such as centimeters or phase angle with respect to the end at which the wave guide 354 is normally connected to the resonant cavity to be tested. Thus, wavelengths or phase angles at the particular frequency for particular measurements (i. e., those contemplated with the circuits of Figs. 11 or 1, respectively), can be read directly from scale 374. Scale 374 can be engraved directly on wave guide 354 or it and various other scales for other particular frequencies can be engraved on separate strip material and any desired scale can then be selected and affixed in proper alignment on wave guide 354 as may be appropriate for the particular frequency and measurement being made. The over-all structure of Fig. 12 represents one suitable form for the coupling determining device 332 of Fig. 11, or the phase angle determining device 5 of Fig. 1.

As shown in the semi-schematic diagram of Fig. 13, the vane 352 should be positioned at a distance of $$-\frac{n\lambda_g}{2}$$

from the parallel resonant (or antiresonant) combination represented schematically by inductance 358, capacitance 360 and resistor 362 connected electrically in parallel. In an equivalent physical circuit, in accordance with the block diagram of Fig. 11, the combination 358, 360, 362 just described will, of course, comprise a resonant cavity such as 334 of Fig. 11 and a length of the wave guide connecting thereto sufficient to present at the outer end of the section of wave guide the electrical impedance characteristics, over the microwave frequency range to be employed, of a parallel resonant (or antiresonant) circuit. A portion or all of the last-mentioned length of wave guide may be that part of the section of wave guide 354 of Fig. 12 which is situated between the resonant cavity and the vane 352.

If the admittance of the resonant cavity and connecting lines is less than the characteristic admittance of the wave guide, $$\left(\frac{1}{Z_0}\right)$$

the insertion of the resistive vane at the point indicated above will decrease the amplitude of the reflected energy, as observed, for example, on oscilloscope 323 of Fig. 11.

Conversely, if the admittance of the resonant cavity and connecting line is greater than the characteristic admittance of the wave guide, the insertion of the resistive vane will increase the amplitude of the reflected energy.

To locate the proper point at which to insert the resistive impedance (vane 352 of Figs. 12 and 13) the resonant cavity, if tunable (such, for example, as the frequency controlling resonant cavity of a reflex klystron oscillator having mechanically or thermally controlled tuning) is detuned. Next, the resistive vane is inserted in the slot (356 of Fig. 12) and moved longitudinally along the wave guide (354 of Figs. 12 and 13) until the reflection (as read, for example, on oscilloscope 323 of Fig. 11) is a maximum. This is the proper position at which to insert the resistive impedance, since off resonance at this point the cavity presents an infinite admittance (or becomes very large), i. e., the standing wave has a voltage null.

If the resonant cavity is not tunable, i. e., if it is a rigid cavity provided with no means for adjusting its resonant frequency, two alternative methods of locating the proper position to insert the resistive vane are available.

One method is to determine by inspection of the physical arrangement of the resonant cavity and associated coupling line whether the combination is series resonant or parallel (anti) resonant. By way of example, from the general shape and relative proportions of a given cavity, those skilled in the art will frequently be able to judge whether the point of coupling to the cavity is at a "high current" or a "high voltage" point (i. e., at a point of high magnetic field or a point of high electric field, respectively, for normal resonance of the cavity). If coupled at a "high current" point, the cavity will act as a series resonant circuit and if coupled at a "high voltage" point the cavity will act as a parallel resonant circuit.

If the cavity and associated coupling line are determined by inspection to be series-resonant, the resistive vane (352 of Figs. 12 and 13) is located an odd number of quarter wavelengths from the coupling point. If the cavity and associated coupling line are determined by inspection to be parallel (anti) resonant, the resistive vane (352 of Figs. 12 and 13) is located at an even number of quarter wavelengths from the coupling point.

In the event that the effective "transformer" (114 of Figs. 4 and 5), coupling the resonant cavity to the wave guide, is relatively frequency insensitive, the correct position to place the resistive vane can be determined by maximizing the reflection at an off-resonance frequency relatively close to the resonant frequency of the cavity (i. e., for example, at 20 megacycles from a resonant frequency in the neighborhood of 4000 megacycles), since the impedance variations with adjustment of the vane position will then vary relatively slowly. In general, for this case $$\Delta f \approx \frac{3f_0}{Q_E}$$

for an error in position due to proximity of resonance of approximately $\frac{1}{40}$ wavelength ($\frac{1}{10}$ of a quarter wavelength). Increased accuracy can be obtained by determining the positions of the vane for two frequencies, off-resonance by equal amounts, on either side of the resonant frequency and placing the vane at the center point between the two positions so determined.

Numerous and varied other arrangements and adaptations of the principles of the invention, clearly within the spirit and scope thereof, will readily occur to those skilled in the art.

What is claimed is:

1. An electromagnetic wave, microwave frequency, impedance measuring circuit which includes means for impressing microwave frequency electromagnetic wave energy upon the impedance under test, means for isolating the portion of said energy reflected by said impedance, indicating means connected to said isolating means for indicating the amplitude of said reflected energy, and means for determining the phase angle of said reflected energy, said last-stated means comprising a section of transmission line interconnecting said impedance with said circuit, said section of transmission line having a longitudinal slot therein said slot being at least a wavelength long at the lowest frequency at which measurements are to be made, a vane of at least semiconductive material adapted to be inserted in said slot, a non-conductive supporting member for said vane adapted to slide longitudinally on said section of transmission line and hold said vane in said slot and prevent transverse movement of said vane, said supporting member having an index mark thereon and a scale affixed to said section of transmission line adjacent the path followed by said supporting member said scale being calibrated to read in convenient units the phase angle of the reflected energy from the cavity under test at the point adjacent said index mark for positions of said vane at which voltage maxima or minima are observed on said indicating means.

2. The arrangement of claim 1, in which the vane is of resistive material.

3. The arrangement of claim 1, in which the vane is of conductive material.

4. A circuit for determining the internal, external and loaded Q's of a resonant cavity at microwave frequencies, said circuit including a generator of microwave frequencies variable over the range of frequencies in which said cavity is to be used, said range including the resonant frequency of said cavity and off-resonance frequencies of said cavity lower and higher in frequency than said resonant frequency, means for varying the frequency of said generator over said range, means for adjusting the output power of said signal generator, means connecting to said last-stated means for dividing the output power between a first transmission path and a second transmission path, said first path including in tandem relation a precision calibrated variable attenuator, an uncalibrated variable attenuator, a precision cavity microwave frequency meter, a first crystal detector and a short circuiting or ground connecting switch on the output of said detector, said second path including, connected in tandem relation, a fixed attenuator, a microwave impedance matching device, the input terminal of a microwave four terminal hybrid junction having input, output and two conjugately related terminals, said last-mentioned two terminals connecting to two side circuits, said two side circuits comprising, respectively, a matching impedance and in tandem relation a coupling determining device and the cavity under test, the output terminal of said hybrid junction connecting to a variable attenuator and the output of said last-mentioned attenuator connecting to a second crystal detector, said circuit further including a switching relay, a cathode ray oscilloscope having horizontal and vertical deflecting means and a sweep control circuit for said oscilloscope, said sweep control circuit connecting to the horizontal deflecting means of said oscilloscope, said switching relay alternately connecting the outputs of said first and said second crystal detectors to the vertical deflecting means of said oscilloscope, said switching relay and said sweep circuit being synchronized with said means for varying the frequency of said generator to synchronize the horizontal sweep of said oscilloscope with the frequency variation of said generator and the operation of said relay with said frequency variation so that consecutive horizontal traces on said oscilloscope represent alternately the output of said first crystal detector and the output of said second crystal detector, respectively.

References Cited in the file of this patent
UNITED STATES PATENTS

| | | |
|---|---|---|
| 2,477,347 | Posey | July 26, 1949 |
| 2,530,248 | Larson | Nov. 14, 1950 |
| 2,569,919 | Bertrand et al. | Oct. 2, 1951 |
| 2,606,974 | Wheeler | Aug. 12, 1952 |
| 2,611,030 | Sontheimer | Sept. 16, 1952 |